US008599004B2

(12) United States Patent
Nakagawa

(10) Patent No.: US 8,599,004 B2
(45) Date of Patent: Dec. 3, 2013

(54) OCCUPANT DETECTION SYSTEM

(75) Inventor: Hajime Nakagawa, Nagoya (JP)

(73) Assignee: Denso Corporation, Kariya (JP)

( * ) Notice: Subject to any disclaimer, the term of this patent is extended or adjusted under 35 U.S.C. 154(b) by 210 days.

(21) Appl. No.: 13/334,682

(22) Filed: Dec. 22, 2011

(65) Prior Publication Data
US 2012/0161953 A1   Jun. 28, 2012

(30) Foreign Application Priority Data

Dec. 28, 2010 (JP) ................................. 2010-291836

(51) Int. Cl.
*B60Q 1/00* (2006.01)
(52) U.S. Cl.
USPC ............................ 340/438; 340/666; 340/667
(58) Field of Classification Search
USPC .............. 340/438, 665, 666, 667, 425.5, 500, 340/540; 180/271–273; 324/457; 297/217.1, 277.3
See application file for complete search history.

(56) References Cited

U.S. PATENT DOCUMENTS 7,859,423 B2 * 12/2010 Yamanaka et al. ............ 340/667

FOREIGN PATENT DOCUMENTS

| JP | 11-271463 | 10/1999 |
|----|-----------|---------|
| JP | 2007-099204 | 4/2007 |
| JP | 2007-225443 | 9/2007 |
| JP | 2011-112541 | 6/2011 |

* cited by examiner

*Primary Examiner* — Toan N Pham
(74) *Attorney, Agent, or Firm* — Harness, Dickey & Pierce, PLC

(57) ABSTRACT

An occupant detection system including an electrostatic sensor, a determination section and a heater is disclosed. The electrostatic sensor includes an electrode arranged inside a seat of a vehicle and configured to generate a weak electric field. The electrostatic sensor outputs an output value associated with the weak electric field. The determination section supplies voltage to the electrode, and performs an occupant determination to determine an occupant on the seat based on the output value of the electrostatic sensor. The heater is inside the seat, and is arranged in parallel with or on a lower side of the electrode. Before performing the occupant determination, the determinations section determines whether or not the heater has a disconnection fault based on the output value of the electrostatic sensor.

8 Claims, 3 Drawing Sheets

OCCUPANT DETECTION SYSTEM

CROSS REFERENCE TO RELATED APPLICATION

The present application is based on and claims priority to Japanese Patent Application No. 2010-291836 filed on Dec. 28, 2010, disclosure of which is incorporated herein by reference.

TECHNICAL FIELD

The present disclosure relates to an occupant detection system for detecting an occupant seated on a seat of a vehicle.

BACKGROUND

A conventional vehicle occupant detection system includes a mat-like-shaped electrostatic sensor and an occupant detection electronic control unit (ECU). In the form of a current or voltage, the electrostatic sensor outputs disturbance of a weak electric field generated between a vehicle body and a main electrode arranged inside a seat. This kind of occupant detection system is described in, for example, JP-H11-271463A.

For example, when a seat is vacant (not occupied), air is inserted between a pair of electrodes of the electrostatic sensor. When a child restraint system (CRS) is mounted to a seat, the CRS is inserted between the pair of electrodes of the electrostatic sensor. When an occupant is seated on a seat, a body of the occupant is inserted between the pair of electrodes of the electrostatic sensor. The air has a relative permittivity of approximately 1. A typical CRS has a relative permittivity of approximately 2 to approximately 5, depending on its material. A typical human body has a relative permittivity of approximately 50. As shown the above, the air, the CRS and the human body are different in relative permittivity. Thus, an electrostatic capacity between the pair of electrodes of the electrostatic sensor changes according to types of inserted object.

This change in electrostatic capacity disturbs the weak electric field between the electrodes, and is outputted as the current or voltage. Based on a value of the outputted current or voltage, the occupant detection ECU performs an occupant determination. For example, the occupant detection ECU determines whether or not the seat is vacant, determines whether or not the CRS is mounted to the seat, and determines whether or not an adult is seated on the seat. The above situation where the CRS is mounted to the seat includes a situation whether the CRS with an infant is mounted to the seat. Based on a result of this determination as to the occupant detection, an airbag ECU determines permission and prohibition of airbag deployment (inflation). Specifically, when the seat is vacant or when the CRS is mounted to the seat, the airbag is placed in an airbag deployment prohibited state. When an adult is seated on the seat, the airbag is placed in an airbag deployment permitted state.

In some cases, a heater that heats a seat by a current flowing in an electric conductor is arranged inside the seat. In this case, the heater and the electrode of the electrostatic sensor are arranged inside the seat. The heater includes the electric conductor in which the current flows. Thus, the heater influences the weak electric field between the electrodes. The occupant detection ECU may be set to perform an occupant determination by taking into account the influence of the electric conductor of the heater.

When a disconnection fault of the heater occurs, the influence of the electric conductor of the heater on the weak electric field changes. The occupant detection ECU is set to perform the occupant determination by assuming that there is no disconnection fault of the heater. When the occupant detection ECU continues to perform the occupant determination in a disconnection fault state, the occupant determination may be erroneously performed.

SUMMARY

In view of the foregoing, it is an objective of the present disclosure to provide an occupant detection system that can determine whether or not a heater inside a seat has a disconnection fault.

According to an example of the present disclosure, an occupant detection system includes an electrostatic sensor, a determination section and a heater. The electrostatic sensor includes an electrode arranged inside a seat of a vehicle and configured to generate a weak electric field. The electrostatic sensor outputs an output value in accordance with magnitude of the weak electric field or in accordance with change in the weak electric field. The output value is outputted as one of a current output and a voltage output. The determination section supplies voltage to the electrode, and performs an occupant determination to determine an occupant on the seat based on the output value of the electrostatic sensor. The heater is inside the seat, and is arranged in parallel with or on a lower side of the electrode. The heater includes an electric conductor to heat up by a current flowing in the electric conductor. Before performing the occupant determination, the determination section determines whether or not the heater has a disconnection fault based on the output value of the electrostatic sensor.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments will be described with reference to the accompanying drawings.

First Embodiment

Figure 1:
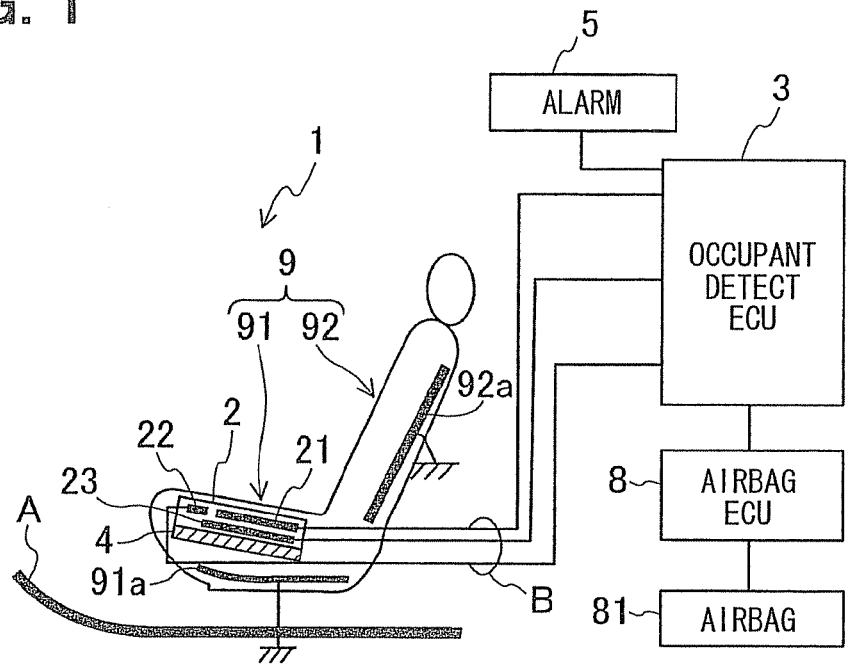
FIG. 1 is a diagram illustrating an occupant detection system.

An occupant detection system 1 of a first embodiment will be described with reference to FIGS. 1 to 5. First, a configuration of a seat 9 of a vehicle will be described. As shown in FIG. 1, the seat 9 includes a seating face part 91 and a backrest part 92. The seating face part 91 is a part on which an occupant sits down. The backrest part 92 is a part which supports a back of the occupant. A bottom portion of the seating face part 91 is equipped with a bottom seat frame 91a, which is electrically connected with a vehicle body "A" (vehicle ground). The backrest part 92 is equipped with a back seat frame 92a, which is electrically connected with the vehicle body "A".

As shown in FIG. 1, the occupant detection system 1 (occupant detection apparatus 1) includes an electrostatic sensor 2, an occupant detection ECU 3, a heater 4, and an alarm 5. The occupant detection ECU 3 can correspond to a determination section or means.

The electrostatic sensor 2 is a capacitive sensor and has a sheet shape as a whole. The electrostatic sensor 2 is arranged inside the seat 9. Specifically, the electrostatic sensor 2 is arranged between a cushion and a cover (outer skin) at an upper portion of the seating face part 91.

Figure 2:
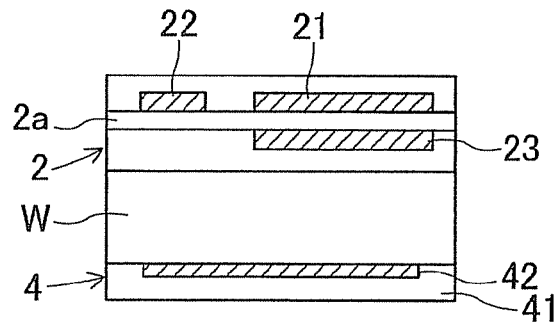
FIG. 2 is a schematic sectional view illustrating an electrostatic sensor and a heater.

As shown in FIG. 2, the electrostatic sensor 2 includes a base film 2a, a main electrode 21, a sub electrode 22 and a guard electrode 23. Specifically, in the electrostatic sensor 2, the main electrode 21 and the sub electrode 22 are located on a first side of the base film 2a, so the main electrode 21, the sub electrode 22 and the outer skin of the seating face part 91 are on the same side of the base film 2a. The guard electrode 23 is on a second side of the base film 2a, so that the guard electrode 23 and the cushion are on the same side of the base film 2a. The first side and the second side of the base film 2a are opposite sides of the base film 2a. The main electrode 21 is arranged over the base film 2a so that the main electrode 21 is arranged generally in a wavy shape as a whole.

The sub electrode 22 is arranged so that the sub electrode 22 is spaced apart from the main electrode 21 and is adjacent to the main electrode 21. The sub electrode 22 is smaller in surface area than the main electrode 21. The sub electrode 22 can be mainly used to detect wetting of the seat 9 from a change in electrostatic capacity between the main electrode 21 and the sub electrode 22.

The guard electrode 23 is spaced apart from the main electrode 21 and is opposed to the main electrode 21. The guard electrode 23 is between the main electrode 21 and the bottom seat frame 91a. The guard electrode 23 and the main electrode 21 are the same in surface area. The guard electrode 23 can be used to prevent electric field generation between the main electrode 21 and the bottom seat frame 91a.

The occupant detection ECU 3 performs an occupant detection, which includes determining a presence and absence of an occupant, and determining a type of occupant. The occupant detection ECU 3 applies an alternating voltage (sinusoidal wave) to the electrostatic sensor 2 at predetermined timing. The electrostatic sensor 2 and the occupant detection ECU 3 are connected via a wire harness "B".

In the present embodiment, in the occupant detection (in an occupant detection mode), the same voltage is applied to the main electrode 21, the sub electrode 22 and the guard electrode 23. Alternatively, in the occupant detection mode, the voltage may be applied to the main electrode 21 and the guard electrode 23. In the seat wetting detection (in a wetting detection mode), the voltage is applied to the sub electrode 22. By switching a switch (not shown), the occupant detection ECU 3 selects one or ones of the electrodes 21 to 23 to which the voltage is applied.

Figure 3:
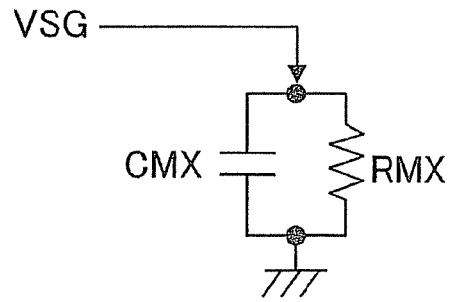
FIG. 3 a diagram illustrating an equivalent circuit of a detection object.

As shown in FIG. 3, an equivalent circuit of a detection object, which is an object to be detected with the electrostatic sensor 2 such as a human body, wetting and the like, can be described as a parallel circuit in which a resistance RMX (real term: conductance) and a capacitance (imaginary term: susceptance) CMX are connected in parallel. Thus, the occupant detection system 1 actually detects an impedance Z having a real term R and an imaginary term C rather than the electrostatic capacitance of the detection object. When the sinusoidal wave is applied from the occupant detection ECU 3 to the detection object, an electric potential difference is generated across an electric current detection resistor (not shown) in the occupant detection ECU 3 in accordance with the impedance Z of the detection object. When there is only the real term R in the impedance Z of the detection object, the electric potential difference generated across the electric current detection resistor does not contain a phase component that is advanced with respect to a signal source VSG (sinusoidal wave). An output depending on only magnitude of the real term R can be obtained by extracting the electric potential difference across the electric current detection resistor at a real term sampling timing which is the same phase with respect to the signal source VSG.

When there is only the imaginary term C in the impedance Z of the detection object, the electric potential difference generated across the electric current detection resistor contains a phase component that is advanced with respect to the signal source VSG. An output depending on only magnitude of the imaginary term C can be obtained by extracting the electric potential difference across the electric current detection resistor at an imaginary term sampling timing which is advanced by 90 degrees with respect to the signal source VSG. Since an actual detection object has a real term R and an imaginary term C, an impedance Z is measured with a variety of phases.

In the above way, the occupant detection ECU 3 measures the electrostatic capacity of the detection object on the seat 9 with the use of lines of electric force generated from the electrostatic sensor 2. Specifically, a current which flows in the electric current detection resistor in response to supply of the above-describe sinusoidal wave signal is converted into a voltage in order to measure the electrostatic capacity of the detection object.

In the occupant detection mode, the occupant detection ECU 3 measures an electrostatic capacity between the main electrode 21 and the vehicle body "A", and then measures an electrostatic capacity between the sub electrode 22 and the vehicle body "A". More specifically, the occupant detection ECU 3 connects the electric current detection resistor to the main electrode 21, and measures an output value from the main electrode 21. Then, the occupant detection ECU 3 connects the electric current detection resistor to the sub electrode 22, and measures an output value from the sub electrode 22. In the occupant detection mode of the present embodiment, a value obtained by addition of the output value of the respective electrodes 21 and 22 is treated as an output value of the electrostatic sensor 2.

Then, the occupant detection ECU 3 switches its operation mode into the wetting detection mode, and measures the electrostatic capacity between the sub electrode 22 and the main electrode 21. Specifically, the occupant detection ECU 3 provides the voltage only to the sub electrode 22. The occupant detection ECU 3 connects the electric current detection resistor to the sub electrode 22, and measures the output value from the sub electrode 22.

The occupant detection ECU 3 stores a threshold used in occupant determination and a threshold used in wetting determination. The occupant detection ECU 3 performs the occupant determination based on the output value of the electrostatic sensor 2 and the stored threshold. The occupant detection ECU 3 performs the wetting determination based on the output value of the electrostatic sensor 2 and the stored threshold. As shown in FIG. 1, the occupant detection ECU 3 is connected with the airbag ECU 8. Based on the presence or absence of an occupant and/or a type of the occupant, the airbag ECU 8 determines whether the airbag 81 is placed in an airbag deployment permitted state or an airbag deployment prohibited state. For example, when it is determined that the seat 9 is in a vacant state or a CRS attached state, the airbag ECU 8 places the airbag 81 in the airbag deployment prohibited state. When it is determined that the seat 9 is in an adult seated state, the airbag ECU 8 places the airbag 81 in the airbag deployment permitted state.

The operation mode of the occupant detection ECU 3 further includes a disconnection detection mode, in which the occupant detection ECU 3 detects a disconnection fault of the heater 4 (electric conductor 42). The detailed description of the disconnection detection mode will be given later. After starting up, the occupant detection ECU 3 sequentially performs operations in the disconnection detection mode, the occupant detection mode and then the wetting detection mode in this order as one cycle.

The heater 4 includes a base 41 having a sheet shape and the electric conductor 42 (wire) having a wavy shape. As shown in FIG. 2, the heater 4 is arranged inside the seat 9 and is located below the electrostatic sensor 2, so that an urethane mat "W" is between the heater 4 and the electrostatic sensor 2. The heater 4 heats up by an electric current flowing in the electric conductor 42, thereby heating the seat 9.

The alarm 5 includes a lamp or the like located at a position where the alarm 5 is viewable by a driver or the like. The alarm 5 lights up in response to a command from the occupant detection ECU 3 when the occupant detection ECU 3 determines that there is the disconnection fault of the heater 4. The alarm 5 can inform the occupant that the occupant detection system 1 is abnormal. The alarm 5 may be arranged in an instrumental panel.

Next, the disconnection detection mode will be described. In the disconnection detection mode, the occupant detection ECU 3 applies the voltage to the main electrode 21, the sub electrode 22, and the guard electrode 23. And the occupant detection ECU 3 connects the electric current detection resistor to the sub electrode 22, and measures the output value from the sub electrode 22. When there is no disconnection fault of the heater 4, the electric field is generated between the sub electrode 22 and the vehicle body "A".

When there is a disconnection fault of the heater 4, a portion of the electric conductor 42 is electrically connected with the vehicle ground due to the disconnection fault, and the electric field is generated between the sub electrode 22 and the portion of the electric conductor 42. Because of this, when the seat 9 is vacant in this case, an electrostatic capacity between the electrodes decreases, and the output value from the sub electrode 22 decreases.

Figure 4:
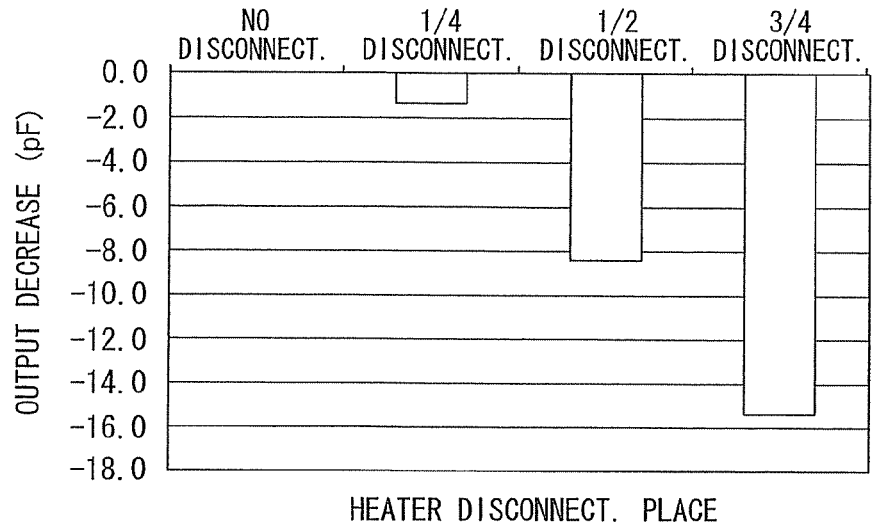
FIG. 4 is a diagram illustrating output values from a sub electrode.

As shown in FIG. 4, when the disconnection fault of the heater 4 occurs at ¼ of the total length of the heater 4 from a power supply end of the heater 4, the output from the sub electrode 22 decreases by approximately 1 pF. The power supply end is an end from which the power is supplied to the heater 4, and may be a vehicle rear side end of the heater 4. When the disconnection fault of the heater 4 occurs at ½ of the total length of the heater 4, the output from the sub electrode 22 decreases by approximately 8 pF. When the disconnection fault of the heater 4 occurs at ¾ of the total length of the heater 4, the output from the sub electrode 22 decreases by approximately 15 pF.

A threshold (also called hereinafter an abnormality threshold) used in determining a presence and absence of the disconnection fault is set in the occupant detection ECU 3. In the present embodiment, the abnormality threshold is set to −0.5 pF.

Figure 5:
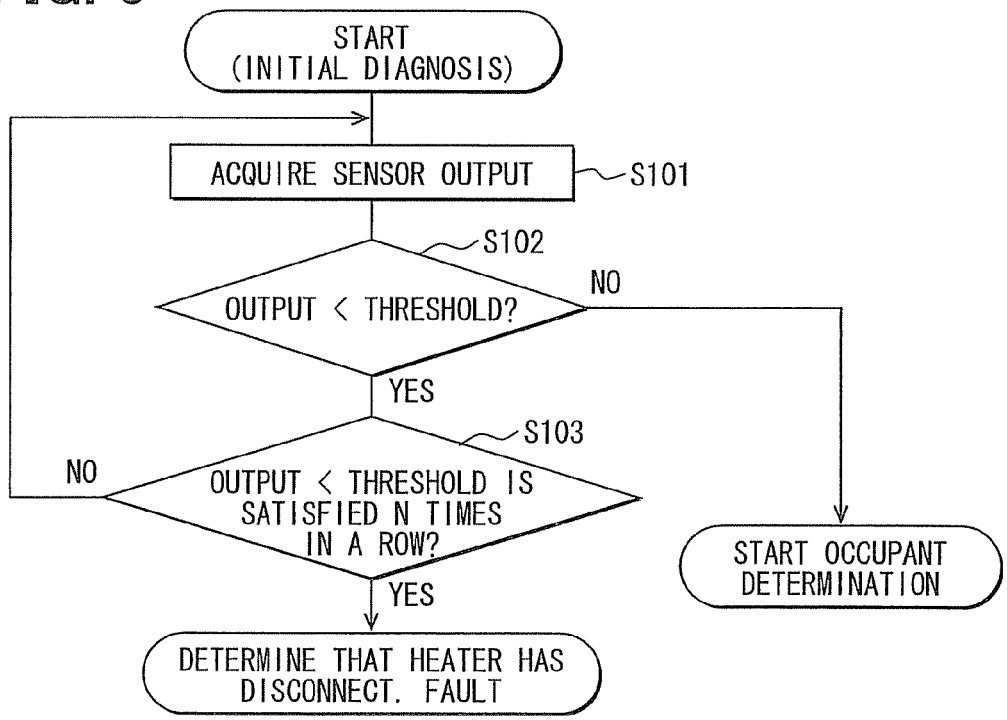
FIG. 5 is a flowchart illustrating a procedure in a disconnection detection mode.

An operation procedure of the present embodiment will be described with reference to FIG. 5. In response to turn on of an ignition switch, the occupant detection ECU 3 starts diagnosing the disconnection fault in the disconnection detection mode. At S101, the occupant detection ECU 3 supplies the voltage to each of the electrodes 21 to 23, and acquires the output value from the sub electrode 22. At S102, the occupant detection ECU 3 compares the acquired output value with the abnormality threshold to determine whether the output value is smaller than the threshold. When it is determined that the output value is not smaller than the threshold, corresponding to NO at S102, the occupant detection ECU 3 switches the operation mode in the occupant detection mode, and starts performing the occupant determination.

When it is determined that the output value is smaller than the threshold, corresponding to YES at S102, the procedure proceeds to S103. At S103, the occupant detection ECU 3 checks whether or not a number of consecutive times it is determined at S102 that the output value is smaller than the abnormality threshold reaches a preset number of times N, where N is natural number equal to or larger than 2. When a number of consecutive times a relation "output value<abnormality threshold" is satisfied is smaller than the preset number of times N, corresponding to NO at S103, the procedure returns to S101, so that the occupant detection ECU 3 performs again the steps S101 and S102, so that the output value of the sub electrode 22 at the present time is again acquired and a comparison between the output value and the abnormality threshold is again made.

When the number of consecutive times the relation "output value<abnormality threshold" is satisfied reaches the preset number of times N, corresponding to YES at S103, the occupant detection ECU 3 determines that there is the disconnection fault of the heater 4. Specifically, only when the relation "output value<abnormality threshold" is satisfied the preset number of times N in a row, it is determined that there is the disconnection fault of the heater 4. In this way, it is possible to improve reliability of disconnection fault determination.

In the present embodiment, when determining that there is the disconnection fault of the heater 4, the occupant detection ECU 3 lights up the alarm 5 and stops the occupant determination. In response to the stop of the occupant determination of the occupant detection ECU 3, the airbag ECU 8 connected with the occupant detection ECU 3 places the airbag 81 in the deployment prohibited state.

As can been seen from the above, according to the present embodiment, it is possible to detect the disconnection fault of the heater 4 before starting the occupant determination. Since the guard electrode 23 is not arranged below the sub electrode 22 and since the decrease in the output value due to the disconnection fault is large, the occupant detection ECU 3 of the present embodiment can detect the disconnection fault with high accuracy. It should be noted that when the occupant is seated on the seat 9, the present embodiment cannot determine whether the disconnection fault exists. This is because the output value of the sub electrode 22 increases when the occupant is seated on the seat 9. If the occupant detection ECU 3 is placed in the disconnection detection mode when the occupant is being seated on the seat, the output value from the sub electrode 22 does not fall below the abnormality threshold, and it is not determined that there is the disconnection fault. Therefore, the advantage of the present embodiment becomes notable in, for example, a situation where a front passenger seat is vacant or a front passenger leaves the front passenger seat.

Figure 6:
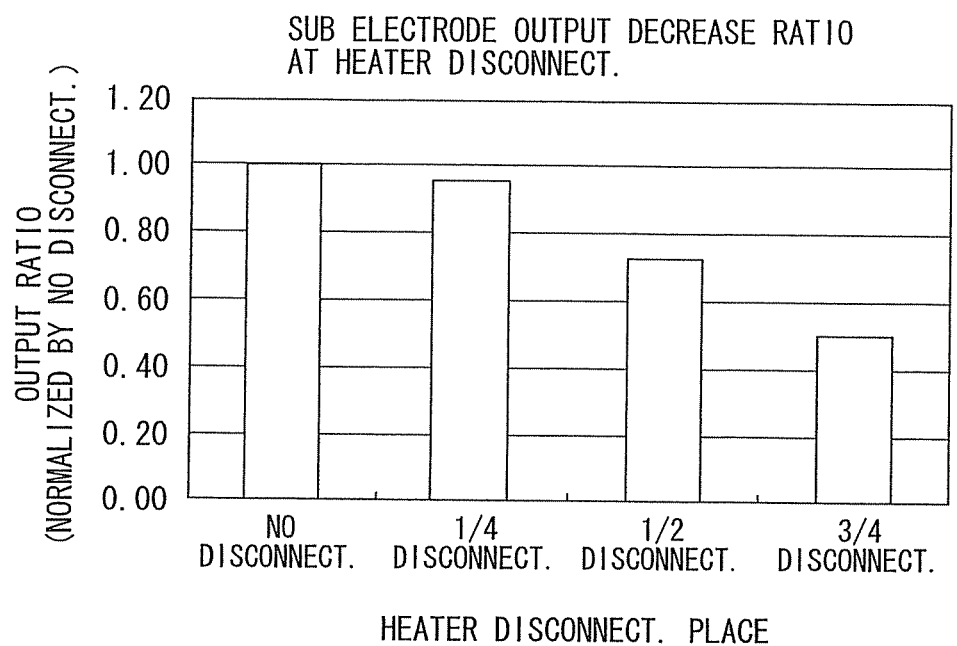
FIG. 6 is a diagram illustrating a ratio of an output value from a sub electrode.

The present embodiment is not limited to the above example, and can be modified in various ways. For example, as shown in FIG. 6, based on a ratio of the output value to a certain value, it may be determined whether not there is a disconnection fault of the heater 4. In the above, the certain value may be the output value that is to be outputted when there is no disconnection fault. When there is the disconnection fault, the output value of the sub electrode 22 decreases, and accordingly, the ratio decreases. When there is no disconnection fault, the ratio is 1. When the disconnection is detected, the ratio becomes less than 1. By storing a threshold for the ratio, the occupant detection ECU 3 can perform the disconnection determination.

Alternatively, even when the relation "output value<abnormality threshold" is satisfied only once, the occupant detection ECU 3 may determine that there is the disconnection fault.

Alternatively, the electrode of the electrostatic sensor 2 may be only the main electrode 21. In this case, in response to an occurrence of the disconnection fault of the heater 4, the electrostatic capacitance between the main electrode 21 and the vehicle body decreases when the seat is vacant. As a result, the output value of the electrostatic sensor 2 decreases. Therefore, the occupant detection ECU 3 can perform the disconnection determination based on the output value of the electrostatic sensor 2. Likewise, in the disconnection detection mode of the present embodiment, the occupant detection ECU 3 may determine whether or not there is the disconnection fault based on the output value of the main electrode 21.

Alternatively, in the disconnection detection mode of the above embodiment, the occupant detection ECU 3 may determine whether or not there is the disconnection fault based on the output value of the guard electrode 23. In the disconnection detection mode, the guard electrode 23 generates the electric field between the guard electrode 23 and the bottom seat frame 91a (and/or the vehicle body "A"). When the disconnection fault of the heater 4 occurs in this state, the output value of the guard electrode 23 decreases in a manner like that in the above-described examples. In the disconnection detection mode, the occupant detection ECU 3 connects the electric current detection resistor to the guard electrode 23, and measures the output value from the guard electrode 23.

Moreover, in the above case, there is no other electrode below the guard electrode 23. Thus, it is possible to detect the disconnection fault in a more direct manner. Specifically, since a degree of decrease in the output value of the guard electrode 23 is larger than a degree of decrease in the output value of the main electrode 21, the occupant detection ECU 3 can detect the disconnection fault with high accuracy.

Second Embodiment

A second embodiment can be substantially the same as the first embodiment in configuration. The second embodiment is different from the first embodiment in disconnection determination manner. Because of this, the second embodiment will be described with reference to FIG. 1.

In the disconnection detection mode, the occupant detection ECU 3 supplies the voltage to the main electrode 21, the sub electrode 22, and the guard electrode 23. Then, like the occupant detection ECU 3 does in the occupant detection mode, the occupant detection ECU 3, to begin with, measures the output value of the main electrode 21 and then measures the output value of the sub electrode 22. Alternatively, the occupant detection ECU 3 may measures the output value of the sub electrode 22 and then measures the output value of the main electrode 21.

The main electrode 21 and the sub electrode 22 are different in the degree of decrease in the output value when the disconnection fault of the heater 4 occurs. That is, the sub electrode 22 is larger than the main electrode 21 in the degree of decrease in the output value. By using this difference, the occupant detection ECU 3 calculates a ratio of the output value of the main electrode 21 to the output value of the sub electrode 22, and compares the calculated ratio with a abnormality threshold, which is a preset ratio. Then, the occupant detection ECU 3 performs the disconnection determination by determining whether or not the ratio of the output value is smaller or larger than the abnormality threshold.

For example, when the occupant is seated on the seat 9, the output value of the main electrode 21 is approximately 150 pF and the output value of the sub electrode 22 is approximately 50 pF. That is, in a normal state, the output value of the sub electrode 22 is approximately ⅓ of the output value of the main electrode 21. In other words, in the normal state, the ratio of the output value of the main electrode 21 to that of the sub electrode 22 is approximately 3:1.

In the case of the disconnection fault of the heater 4, the output value of the main electrode 21 slightly decreases while the output value of the sub electrode 22 largely decreases. As a result, the output value of the sub electrode 22 becomes approximately ⅕ of the output value of the main electrode 21. In other words, the ratio of the output value of the main electrode 21 to that of the sub electrode 22 becomes approximately 5:1. Thus, for example, by setting the abnormality threshold to ¼ (by setting the threshold of the ratio of the output of the main electrode 21 to that is the sub electrode 22 to 4:1), it becomes possible to detect the disconnection fault of the heater 4. This is because the output value of the sub electrode 22 becomes approximately smaller than ¼ of the output value of the main electrode 21 if there is the disconnection fault.

As can be seen from the above, the occupant detection system 1 of the second embodiment determines whether there is the disconnection fault of the heater 4 based on the output value of the main electrode 21 and the output value of the sub electrode 22. The second embodiment can detect the disconnection fault of the heater 4 even when the occupant is seated on the seat 9.

The present disclosure has various aspects. For example, according to an aspect of the present disclosure, the following occupant detection system can be provided. The occupant detection system includes an electrostatic sensor, a determination section and a heater. The electrostatic sensor includes an electrode arranged inside a seat of a vehicle and configured to generate a weak electric field. The electrostatic sensor outputs an output value in accordance with magnitude of the weak electric field or in accordance with change in the weak electric field. The output value is outputted as one of a current output and a voltage output. The determination section supplies voltage to the electrode, and performs an occupant determination to determine an occupant on the seat based on the output value of the electrostatic sensor. The heater is inside the seat, and is arranged in parallel with or on a lower side of the electrode. The heater includes an electric conductor to heat up by a current flowing in the electric conductor. Before performing the occupant determination, the determination section determines whether or not the heater has a disconnection fault based on the output value of the electrostatic sensor. The heater may be arranged at the same height as or below the electrode.

According to the above configuration, it is possible to generate the weak electric field between the electrode and the vehicle body (vehicle ground), and it is possible to perform the occupant determination based on a change in electrostatic capacity between electrodes, the change being caused by, for example, a presence and absence of the occupant. An occurrence of the disconnection fault of the heater changes the weak electric field between the electrodes change. In the above configuration, by checking this change before starting the occupant determination, the occupant detection system can detect the disconnection fault of the heater. That is, the above occupant detection system can determine whether or not there is the disconnection fault of the heater.

The above occupant detection system may be configured such that: the determination section determines that the heater has the detection fault when the output value of the electrostatic sensor is smaller than a preset threshold.

According to this configuration, it is possible detect the disconnection fault of the heater by comparing the electrostatic capacitance between the electrodes with the preset threshold. In the above, the electrostatic capacitance between the electrodes may decreases in response to the disconnection fault of the heater if the seat is vacant.

The above occupant detection system may be configured in the following way. The determination section compares the output value of the electrostatic sensor with a preset threshold to determine whether or not the output value of the electrostatic sensor is smaller than a preset threshold. After elapse of a predetermined period from a time when the determination section determines that the output value of the electrostatic sensor is smaller than the preset threshold, the determination section again compares the output value of the electrostatic sensor with the preset threshold to determine whether or not the output value of the electrostatic sensor is smaller than the preset threshold. The determination section determines that the heater has the disconnection fault when a number of consecutive times the determination section determines that the output value of the electrostatic sensor is smaller than the preset threshold reaches a preset number of times.

According to this configuration, only after the output value of the electrostatic sensor is determined to be smaller than the preset threshold the preset number of times in a row, the determination section determines that there is the disconnection fault. Therefore, the occupant detection system can determine the disconnection fault with high accuracy.

The above occupant detection system may be configured in the following way. The electrode of the electrostatic sensor is provided as a plurality of electrodes including a main electrode, a sub electrode, and a guard electrode. The sub electrode is arranged apart from and adjacent to the main electrode. The guard electrode is arranged apart from and below the main electrode so that the guard electrode is opposed to the main electrode. When the weak electric field is generated from the main electrode, the sub electrode and the guard electrode, the determination section uses the output value from the sub electrode as the output value of the electrostatic sensor to determine whether or not the heater has the disconnection fault.

According to this configuration, the determination section generates the weak electric field from the main electrode, the sub electrode and the guard electrode, and performs the occupant determination based on the change in electrostatic capacitance between the main electrode and the vehicle body, and the change in electrostatic capacitance between the sub electrode and the vehicle body. Furthermore, in this configuration, the disconnection fault of the heater is determined based on the change in electrostatic capacitance between the sub electrode and the vehicle body. Furthermore, in this configuration, the guard electrode is not arranged below the sub electrode. Thus, the detection of the disconnection fault of the heater arranged in parallel with or blow the electrode is not hampered by the guard electrode. Therefore, it is possible to monitor the disconnection fault of the heater in a direct manner. Determination accuracy improves.

Alternatively, the above occupant detection system may be configured in the following way. The electrode of the electrostatic sensor is provided as a plurality of electrodes including a main electrode, a sub electrode, and a guard electrode. The sub electrode is arranged apart from and adjacent to the main electrode. The guard electrode is arranged apart from and below the main electrode so that the guard electrode is opposed to the main electrode. When the weak electric field is generated from the main electrode, the sub electrode and the guard electrode, the determination section uses a ratio of (i) the output value from the main electrode to (ii) the output value from the sub electrode to determine whether or not the heater has the disconnection fault.

According to this configuration, the determination section performs the occupant determination based on the change in electrostatic capacitance between the main electrode and the vehicle body, and the change in electrostatic capacitance between the sub electrode and the vehicle body. A degree of change in electrostatic capacitance between the main electrode and the vehicle body in response to the occurrence of the disconnection fault of the heater is small. This is because the guard electrode is located below the main electrode. By contrast, a degree of change in electrostatic capacitance between the sub electrode and the vehicle body in response to the occurrence of the disconnection fault of the heater is large. This is because the guard electrode is not located below the sub electrode. Thus, the disconnection fault of the hater changes a ratio of the degree of change in electrostatic capacitance between the main electrode and the vehicle body to the degree of change in electrostatic capacitance between the sub electrode and the vehicle body. By detecting this change, the determination section can determine that there is the disconnection fault of the heater.

Alternatively, the occupant detection system may be configured in the following way. The electrode of the electrostatic sensor is provided as a plurality of electrodes including a main electrode, a sub electrode, and a guard electrode. The sub electrode is arranged apart from and adjacent to the main electrode. The guard electrode is arranged apart from and below the main electrode so that the guard electrode is opposed to the main electrode. When the weak electric field is generated from the main electrode and the guard electrode, the determination section uses the output value from the main electrode as the output value of the electrostatic sensor to determine whether or not the heater has the disconnection fault.

According to this configuration, when the heater is in a disconnection fault state, the electrostatic capacitance between the main electrode and the vehicle body when the seat is vacant decreases. By detecting this decrease, the determination section can detect the disconnection fault.

Alternatively, the occupant detection system may be configured in the following way. The electrode of the electrostatic sensor is provided as a plurality of electrodes including a main electrode, a sub electrode, and a guard electrode. The sub electrode is arranged apart from and adjacent to the main electrode. The guard electrode is arranged apart from and below the main electrode so that the guard electrode is opposed to the main electrode. When the weak electric field is generated from the main electrode, the sub electrode and the guard electrode, the determination section uses the output value from the guard electrode as the output value of the electrostatic sensor to determine whether or not the heater has the disconnection fault.

According to this configuration, by monitoring the change in electrostatic capacitance between the guard electrode and the vehicle body, it is possible to determine whether or not there is the disconnection fault of the heater. Furthermore, since no electrode is arranged below the guard electrode, it is possible to detect the disconnection fault of the heater in a direct manner.

The above occupant detection system may further include an alarm that informs the occupant of an abnormality when the determination section determines that the heater has the disconnection fault. In addition, the above occupant detection system may be further configured such that: upon determining that the heater has the disconnection fault, the determination section stops the occupant determination.

According to this configuration, the occupant can confirm the abnormality of the occupant detection system. Furthermore, because of the stop of the occupant determination, it is possible to prevent an erroneous detection.

Although the present invention has been fully described in connection with the above embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. An occupant detection system comprising:
    an electrostatic sensor that includes an electrode arranged inside a seat of a vehicle and configured to generate a weak electric field, wherein the electrostatic sensor outputs an output value in accordance with magnitude of the weak electric field or in accordance with change in the weak electric field, wherein the output value is outputted as one of a current output and a voltage output;
    a determination section that supplies voltage to the electrode, and performs an occupant determination to determine an occupant on the seat based on the output value of the electrostatic sensor; and
    a heater that is inside the seat, and is arranged in parallel with or on a lower side of the electrode, wherein the heater includes an electric conductor to heat up by a current flowing in the electric conductor,
    wherein:
    before performing the occupant determination, the determination section determines whether or not the heater has a disconnection fault based on the output value of the electrostatic sensor.

2. The occupant detection system according to claim 1, wherein:
    the determination section determines that the heater has the disconnection fault when the output value of the electrostatic sensor is smaller than a preset threshold.

3. The occupant detection system according to claim 2, wherein:
    the electrode of the electrostatic sensor is provided as a plurality of electrodes including a main electrode, a sub electrode, and a guard electrode;
    the sub electrode is arranged apart from and adjacent to the main electrode;
    the guard electrode is arranged apart from and below the main electrode so that the guard electrode is opposed to the main electrode; and
    when the weak electric field is generated from the main electrode, the sub electrode and the guard electrode, the determination section uses the output value from the sub electrode as the output value of the electrostatic sensor to determine whether or not the heater has the disconnection fault.

4. The occupant detection system according to claim 2, wherein:
    the electrode of the electrostatic sensor is provided as a plurality of electrodes including a main electrode, a sub electrode, and a guard electrode;
    the sub electrode is arranged apart from and adjacent to the main electrode;
    the guard electrode is arranged apart from and below the main electrode so that the guard electrode is opposed to the main electrode; and
    when the weak electric field is generated from the main electrode and the guard electrode, the determination section uses the output value from the main electrode as the output value of the electrostatic sensor to determine whether or not the heater has the disconnection fault.

5. The occupant detection system according to claim 2, wherein:
    the electrode of the electrostatic sensor is provided as a plurality of electrodes including a main electrode, a sub electrode, and a guard electrode;
    the sub electrode is arranged apart from and adjacent to the main electrode;
    the guard electrode is arranged apart from and below the main electrode so that the guard electrode is opposed to the main electrode; and
    when the weak electric field is generated from the main electrode, the sub electrode and the guard electrode, the determination section uses the output value from the guard electrode as the output value of the electrostatic sensor to determine whether or not the heater has the disconnection fault.

6. The occupant detection system according to claim 1, wherein:
    the determination section compares the output value of the electrostatic sensor with a preset threshold to determine whether or not the output value of the electrostatic sensor is smaller than the preset threshold;
    upon elapse of a predetermined period from a time when the determination section determines that the output value of the electrostatic sensor is smaller than the preset threshold, the determination section again compares the output value of the electrostatic sensor with the preset threshold to determine whether or not the output value of the electrostatic sensor is smaller than the preset threshold; and
    the determination section determines that the heater has the disconnection fault when a number of consecutive times the determination section determines that the output value of the electrostatic sensor is smaller than the preset threshold reaches a preset number of times.

7. The occupant detection system according to claim 1, wherein:
    the electrode of the electrostatic sensor is provided as a plurality of electrodes including a main electrode, a sub electrode, and a guard electrode;
    the sub electrode is arranged apart from and adjacent to the main electrode;
    the guard electrode is arranged apart from and below the main electrode so that the guard electrode is opposed to the main electrode; and
    when the weak electric field is generated from the main electrode, the sub electrode and the guard electrode, the determination section uses a ratio of (i) the output value from the main electrode to (ii) the output value from the sub electrode to determine whether or not the heater has the disconnection fault.

8. The occupant detection system according to claim 1, further comprising:

an alarm that informs the occupant of an abnormality when the determination section determines that the heater has the disconnection fault,
wherein:
upon determining that the heater has the disconnection fault, the determination section stops the occupant determination.

* * * * *